US006596199B2

(12) United States Patent
Patel

(10) Patent No.: US 6,596,199 B2
(45) Date of Patent: *Jul. 22, 2003

(54) CARBON-REINFORCED PC-ABS COMPOSITION AND ARTICLES MADE FROM SAME

(75) Inventor: Nirajkumar Patel, Delmar, NY (US)

(73) Assignee: General Electric Company, Pittsfield, MA (US)

( * ) Notice: Subject to any disclaimer, the term of this patent is extended or adjusted under 35 U.S.C. 154(b) by 39 days.

This patent is subject to a terminal disclaimer.

(21) Appl. No.: 09/794,175

(22) Filed: Feb. 27, 2001

(65) Prior Publication Data

US 2001/0023937 A1 Sep. 27, 2001

Related U.S. Application Data

(63) Continuation of application No. 09/496,757, filed on Feb. 3, 2000, now Pat. No. 6,231,788.

(51) Int. Cl.[7] ............................ H01B 1/24; C04B 35/52; B28B 1/24
(52) U.S. Cl. ...................... 252/511; 264/614; 264/641; 106/472
(58) Field of Search .................. 252/511; 524/495; 106/472; 264/5, 614, 641

(56) References Cited

U.S. PATENT DOCUMENTS

| 4,065,519 A | 12/1977 | Koch |
| 4,559,164 A | 12/1985 | Kostelnik et al. |
| 4,781,947 A | 11/1988 | Saito et al. |
| 5,004,561 A | 4/1991 | Nomura et al. |
| 5,068,061 A | 11/1991 | Knobel et al. |
| 5,216,046 A | 6/1993 | Kozmiski |
| 5,223,563 A | 6/1993 | Axelrod |
| 5,227,236 A | 7/1993 | Handermann ............... 428/361 |
| 5,227,238 A | 7/1993 | Hirai et al. |
| 5,237,009 A | 8/1993 | Lee |
| 5,298,576 A | 3/1994 | Sumida et al. |
| 5,334,635 A | 8/1994 | Udipi |
| 5,491,187 A | 2/1996 | Ward et al. |
| 5,591,382 A | 1/1997 | Nahass et al. |
| 5,639,807 A | 6/1997 | Secrist et al. |
| 5,641,572 A | 6/1997 | Yoshimura et al. |
| 5,651,922 A | 7/1997 | Nahass et al. |
| 5,820,788 A | 10/1998 | Smith |
| 5,863,466 A | 1/1999 | Mor |
| 5,879,589 A | 3/1999 | Miyanaga et al. |
| 5,955,517 A | 9/1999 | Hilti et al. |
| 5,958,303 A | 9/1999 | Narkis et al. |

FOREIGN PATENT DOCUMENTS

| EP | 0371444 A2 | 6/1990 | ........... C08L/69/00 |
| EP | 0682081 A1 | 11/1995 | ........... C08L/69/00 |
| JP | 53106752 | 9/1978 | ........... C08L/77/00 |
| WO | WO 97/35715 | 10/1997 | ............. B32B/5/04 |

*Primary Examiner*—Mark Kopec

(57) ABSTRACT

Carbon fiber-filled PC-ABS resin compositions which have improved electrical properties at a given level of carbon fibers, and which do not suffer from as significant a decrease in impact strength as would result from the introduction of generic carbon fibers are achieved using carbon fibers treated with a polyamide terpolymer binder. The bundles are dispersed within the PC-ABS blend. The compositions can be used for injection molding of articles for use as components in applications requiring static dissipation and/or EMI shielding. Such articles include, but are not limited to electronic devices, dust handling equipment and notebook computer enclosures.

17 Claims, No Drawings

CARBON-REINFORCED PC-ABS COMPOSITION AND ARTICLES MADE FROM SAME

This is a continuation of application Ser. No. 09/496,757 filed on Feb. 3, 2000 U.S. Pat. No. 6,231,788, which is incorporated herein by reference.

FIELD OF THE INVENTION

This application relates to blends of polycarbonate (PC) and acrylonitrile-butadiene-styrene (ABS) resin that are reinforced with carbon fiber. The compositions have improved impact strength as well as excellent electrostatic dissipative characteristics.

BACKGROUND OF THE INVENTION

Articles made from thermoplastic resins are commonly utilized in the material-handling devices, electronic devices and business equipment, for example chip carriers, notebook computer enclosures and printer and copier components in contact with moving paper such as paper paths—and moving components themselves—such as ink-jet printer pen-holders. Electrostatic dissipation is an especially important issue within the electronic industry because of the inherently insulative nature of polymeric materials. Electrostatic dissipation (or discharge) is defined as a transfer of electrostatic charge between bodies at different potentials caused by direct contact or induced by an electrostatic field. As electronic devices become smaller and faster, their sensitivity to electrostatic dissipation (ESD) increases.

The US Department of Defense Handbook 263 (DOD-HDK-263) defines three categories of plastics for use in ESD protection: antistatic, static dissipating, and conductive. Characteristics of each type are listed in Table 1. Conductive fillers such as carbon fibers can be incorporated into polymeric materials to modify the electrical properties to achieve any of these three characteristics. In particular, carbon fibers facilitate dissipation of static charge and provide enhanced electromagnetic shielding. (See, for example, U.S. Pat. Nos. 4,559,164 and 5,004,561).

TABLE 1

Categories of Materials for ESD/EMI Protection

| Material Category | Material Description |
|---|---|
| Antistatic | Will not generate a charge. Will not allow a charge to remain localized on part surface. Refers to a material's ability to resist triboelectric charge generation. |
| Static Dissipating | Will not generate a charge. Will not allow a charge to remain localized on part surface. Can safely bleed an electric charge to ground. Surface resistivity between $10^5$ and $10^9$ Ohm/Sq. |
| Conductive | Will not generate a charge. Will not allow a charge to remain localized on part surface. Can ground a charge quickly. Will shield parts from electromagnetic fields. Surface resistivity < $10^5$ Ohm/Sq. |

Carbon fiber suppliers treat fiber surfaces to tailor the fibers for specific resin(s). Typical surface treatments used include air oxidation, anodic oxidation and wet oxidation. (J. M. Clark and D. R. Secrist, "Effect of Fiber Surface Treatment on the Properties of Carbon Fiber Reinforced Nylon Composites," Journal of Thermoplastic Composite Materials, Vol. 1, pp. 232–241 (1988); E. Fitzer and R. Weiss, "Effect of Surface Treatment and Sizing of C-Fibers on the Mechanical Properties of CFR Thermosetting and Thermoplastic Polymers," Carbon, Vol. 25, No. 4, pp. 455–467, (1987)). Binder is applied to these surface treated fibers and fibers are chopped. The purpose of the binder is to hold fiber bundles together (during handling and feeding). The binder is supposed to dissolve in the polymer matrix at high temperatures experienced during compounding performed in extruders. Utilization of binders is described in U.S. Pat. Nos. 4,781,947; 5,298,576; 5,641,572 and 5,639,807.

While carbon fibers have been utilized to improve electrical properties in thermoplastic resins, such fibers also contribute significantly to the cost of the articles, and can be detrimental to the impact strength and processability of the thermoplastic resin when used for injection molding. This problem is particularly significant in blends of polycarbonate (PC) and acrylonitrile-butadiene-styrene copolymer (ABS). Such blends offer outstanding balance of mechanical properties, heat resistance, flow and cost. Performance of PC-ABS blend-based materials can be tailored for a particular application by varying the ratio of PC and ABS components. PC-ABS blends are often formulated with carbon fibers to impart high modulus and static dissipative properties. Due to the ease of processing and high flow, carbon fiber-filled PC-ABS compounds can be used to fill thin wall sections and complex parts in injection molding processes. However, one of the drawbacks of carbon fiber-filled PC-ABS is its low impact strength. Improvement in impact strength of carbon fiber-filled PC-ABS compositions, without affecting the modulus, static dissipative characteristics and cost would therefore be very useful.

SUMMARY OF THE INVENTION

The present invention provides a carbon fiber-filled PC-ABS resin composition which has improved electrical properties at a given level of carbon fibers, and which does not suffer from as significant a decrease in impact strength as would result from the introduction of generic carbon fibers. In the composition of the invention, the carbon fibers are associated into bundles with a polyamide terpolymer binder. The bundles are dispersed within the PC-ABS blend. The compositions of the invention can be used for injection molding of articles for use as components in applications requiring static dissipation and/or EMI shielding. Such articles include, but are not limited to electronic devices, dust handling equipment and notebook computer enclosures.

DETAILED DESCRIPTION OF THE INVENTION

The composition of the invention comprises a polymer blend of polycarbonate and an acrylonitrile-butadiene-styrene copolymer, and carbon fibers associated into bundles with a polyamide terpolymer binder. The bundles are dispersed within the polymer blend.

The composition of the PC-ABS blend may be varied to achieve desired properties in the final material. In general, the blend will range in composition from 10 to 90% PC by weight, preferably about 45 to 75% by weight, with lower amounts of PC being used when it is desired to have a composition with good flow and larger amounts of PC being used to produce a more heat resistant product. The ABS component may be an acrylonitrile-butadiene-styrene terpolymer or a blend of styrene-butadiene rubber and styreneacrylonitrile copolymer. As used herein, the term "acrylonitrile-butadiene-styrene copolymer" or "ABS" refers to either of these alternatives." A specific PC-ABS blend which may be used is sold by General Electric Co. under the tradename CYCOLOY (for example CYCOLOY C6200).

Examples of carbon fibers which may be suitably employed in the composition of the invention include those sold under the following tradenames: FORTAFIL CA and FORTAFIL CM (Fortafil Fibers, Inc), ZOLTEK HT (Zoltek Corporation), TORAY (Toray Industries, Inc.), and GRAFIL (Mitsubishi). The fibers are associated into bundles with a polyamide terpolymer binder, such as the polyamide terpolymer binder sold by DuPont under the tradename ELVAMIDE. Such binder-treated fibers can be produced by a conventional carbon fiber manufacturing process. Continuous filament carbon fibers are produced by pyrolyzing, or decomposing by heating, carbon-containing fibers such as rayon, polyacrylonitrile and petroleum pitch. The carbon fibers retain the physical shape and surface texture of the precursor fibers from which they are made. After carbonization, the fibers are surface treated. Then, the binder is applied on the fiber surface, after which the fibers are chopped to produce chopped products.

In the binder application process, continuous fiber bundles are pulled in a wet bath to coat the fibers with a desired amount of binder. The binder-coated fiber bundles, which are called a "wet forming package" are then either dried to produce a "dried forming package" or passed directly to the chopping process. The amount of binder is suitably from 0.5 to 10% by weight of the fibers.

Chopped strands can be produced by either of two major processes. In the first process, dried-forming packages are used as the source. A number of strand ends are fed into a chopper, which chops them into the correct length, for example ⅛ inch to ½ inch (0.31 to 1.27 cm) in size. The product is then screened to remove fuzz and contamination. The second process is a direct chop process in which large bushings are used in forming, and the strands are chopped in a wet state directly after the binder is applied. The wet, chopped strands are then dried and screened.

The bundles of carbon fibers are combined with the PC-ABS blend in an amount effective to achieve the desired electrical properties in a molded article produced from the mixture. For example, carbon fibers treated with polyamide terpolymer binder may be suitably utilized in amounts of from 5 to 50%, preferably 7 to 30% by weight of the PC-ABS blend. The combination of the PC-ABS blend and the carbon fibers is compounded at an elevated temperature, which is generally in the range of 450 to 550° F. (232 to 287° C.). Compounding may be carried out in various types of equipment known in the art. In the examples set forth below, a Werner & Pfleiderer co-rotating intermeshing twin-screw extruder was utilized. This extruder has a primary (upstream) melting and mixing section which was used for initial melting of the thermoplastic resin, and a secondary (downstream) section in which carbon fibers were added and mixed to distribute them within the melted resin.

The resulting carbon-filled PC-ABS resins have good impact strength as measured using various test methods for impact strength. This impact strength is significantly superior to the impact strength observed for the same fiber type and fiber loading but using the binder used by the fiber manufacturer. Impact strength can be measured using the Notched Izod Impact Strength Test (ASTM D256) and the Instrumented Impact Test (ASTM D 3763). Unfilled CYCOLOY C6200 PC-ABS blend has a Notched Izod Impact Strength at 73° F. (23° C.) of 10 ft-lb/in and an Instrumented Impact Total Energy of 45 ft-lb. PC-ABS compounded with 8 or 10% of previously known fiber/binder combinations have Notched Izod Impact Strengths of about 1.3 ft-lb/in or less and Instrumented Impact Total Energies of about 12 ft-lbs or less. PC-ABS compounded with 8 or 10% carbon fibers treated with polyamide terpolymer binder have Notched Izod Impact strengths of 1.8 ft lb/in or greater and Instrumented Impact Total Energies of 15 ft lbs or greater. Thus, the loss of impact strength resulting from equal levels of fiber filling is not as significant in the compositions of the invention.

The resulting carbon-filled PC-ABS resins also have desirable ESD properties, as reflected in measurements of the volume resistivity. Volume resistivity is a measure of the leakage current directly through a material. It is defined as the electrical resistance through a one-centimeter cube of material and is expressed in ohm-cm. The lower the volume resistivity of a material, the more conductive the material is. Thus, for purposes of achieving desirable ESD properties, a lower volume resistivity is better. One procedure for measuring volume resistivity involves preparing 3 in.×6 in.× 0.125 in. plaques (76 mm×152 mm×3.2 mm), by sanding the short ends of the plaques to a smooth surface and then painting them with silver paint. The sample plaque is inserted into the test fixture, and the resistance between the painted ends under a constant force is measured with a digital multimeter. The resistivity is calculated from the measured resistance and the sample geometry. As shown in Example 4 below, volume resistivity for fibers in accordance with the invention was superior to that achieved in the comparative examples.

Another electrical property of importance in many applications is the EMI shielding. Shielding is provided by a conductive medium that reflects, absorbs or transmits the electromagnetic radiation to the ground. Shielding effectiveness is determined by the extent to which the intensity of an electromagnetic signal is reduced by the introduction of a shielding medium. Materials are tested for attenuation or reduction of a signal, which is expressed in decibels (db). Shielding effectiveness measured in db is a logarithmic scale, which means that an attenuation measurement of 50 db is ten times more effective than a measurement of 40 db. The ASTM has adopted two testing methods for EMI shielding: MIL-STD-285 and ASTM D-4935-89 (Table 2).

TABLE 2

Methods for Testing EMI Shielding Effectiveness

Coaxial Transmission Line Method

Data are measured in Far Field condition or a plane wave.
Test fixture: torpedo shape with maximum diameter of 21.4 in. × 5.2 in. (544 mm × 132 mm)
Test specimen: washer configuration; external diameter = 4 in. (102 mm); internal diameter = 1.7 in. (43 mm).

Shield Box (Dual Chamber) Method

Data are measured in Near Field condition.
Fixture is steel box 7.0 in. × 6.0 in. × 6.3 in. (178 mm × 152 mm × 160)
Test specimen is 3.0 in. × 6.0 in. plaque. (76 mm × 152 mm)

As shown in Example 4 and Tables 4B, good shielding effectiveness values in excess of 30 db were achieved using compositions in accordance with the invention. In contrast, compositions made with other binders had much lower shielding effectiveness values.

Analysis of samples prepared using fibers with different binders in the same resin system indicated that at a particular loading, there were no significant differences in the dispersion or the aspect ratio of fibers. Fracture surface analysis of the samples, however, revealed that adhesion was poor in the case of fibers with polyamide terpolymer binder in a PC-ABS resin. SEM photomicrographs showed less resin adhering to fibers in the case of polyamide terpolymer binder and the fibrillar structure of the fiber surface could be clearly seen. In general, the fiber wetting and resin-fiber adhesion was poor when polyamide terpolymer binder was used. With other binders evaluated in this study, the resin-fiber adhesion is good, which shows that the fiber surface topography is masked by resin adhering to the fibers.

While not intending to be bound by any particular mechanism of action, it is believed that using binders which are incompatible with the resin matrix results in an alteration of the resin-fiber interaction. In a composite material, if more energy is spent during fiber pull-out, the fracture toughness is higher. When the resin-fiber interface is strong, cracks may go through the reinforcement, result in poor toughness. In contrast, in a composite in which the resin-fiber interface is the weakest link, crack propagation may take a tortuous path, resulting in the expenditure of significant energy. Thus, a weak resin-fiber interface is actually preferred to produce a composite with high impact strength. This same weak interaction between the resin and the fiber apparently also contributes to improved electrical properties.

The properties of the compositions of the present invention are quite surprising, given that polyamide (Nylon) usually degrades polycarbonate resins by reaction of secondary amine (amide) groups with polycarbonate (see for example Foldi, V. S. and Campbell, T. W., *J. Poly. Sci.*, 1962, 56, 1).

In addition to carbon fibers as described above, the compositions of the invention may include additional fillers. Non-limiting examples of other fillers which may be included are glass fibers, mica, talc, clay and wollastonite. Minor amounts of other materials can also be included to modify specific properties of the composition. For example, polytetrafluoroethylene (PTFE) in amounts of up to about 1% could be included as part of a flame retardant package. Other types of flame retardant packages including brominated flame retardant polymers (e.g., brominated PC) or phosphorus-containing organic flame retardants (such as resorcinal diphosphate, bisphenol A diphosphate or tetraxylyl piperazine diphosphamide) can also be included in effective amounts up to about 20%. PTFE could also be included in larger amounts, up to about 25%, to improve wear resistance; and polyethylene could be included in amounts up to about 2% to improve mold release characteristics. Impact modifiers such as styrene-butadiene-styrene (SBS) can be included in amounts up to about 10% to further improve impact strength. Flow promoters such as hydrogenated polyterpene can also be included in amounts up to about 10%.

The compositions of the invention may be used in a method for making an injection-molded article. The method comprises the steps of:
(a) preparing a composition comprising a PC-ABS blend, and carbon fibers associated into bundles with a polyamide terpolymer binder, said bundles being dispersed within the PC-ABS blend;
(b) heating the composition to melt the PC-ABS blend; and
(c) injecting the heated composition into a mold shaped to form the article.

Heating step (b) may be performed separately from any heating utilized in the preparation of the composition, for example if the composition is formed into pellets for shipment to a remote location for use. Heating step (b) may also be integral to and continuous with heating utilized in the formation of the composition itself. The temperature to which the materials are heated, and the conditions in the injection mold depend principally on the nature of the polymeric resin. For a PC-ABS blend such as CYCOLOY C6200, the composition is suitably compounded at a temperature of 500° F. (260° C.), at 300 rpm and a through-put of 45 lb/hr. (20.4 kg/hr) in a Werner & Pfleiderer 30 mm twin screw extruder. Injection molding is carried out of a melt having a temperature of 500° F., with a mold temperature of 160° F. (71° C.). Higher temperatures may be appropriate with increased PC content.

The invention will now be further illustrated by way of the following non-limiting examples.

EXAMPLE 1

To prepare polyamide terpolymer treated chopped fibers, continuous carbon fiber strands were obtained for the following suppliers: ZOLTEK HT fibers from Zoltek Corporation, GRAFIL fibers from Mitsubishi and FORTAFIL CA fibers from Fortafil Fibers, Inc. Each of the continuous fibers was placed on a free-wheel reel. The strand was pulled from the reel and dipped into a bath filled with an aqueous solution of polyamide terpolymer (ELVAMIDE 8063, DuPont) at room temperature. The wet carbon-fiber bundle was then pulled into a 8 ft long metal tubular drying section equipped with an infrared heater and air blower. The temperature inside the tube was 250° F. (121° C.). The dried carbon fiber bundle was fed into a chopper where it was chopped into ⅛ inch (0.31 cm) lengths. The resultant chopped carbon fiber was coated with 6% by weight of polyamide terpolymer binder.

EXAMPLE 2

Zoltek HT carbon fibers and GRAFIL carbon fibers treated with polyamide terpolymer binder using the procedure of Example 1 were combined with a CYCOLOY C6200 PC-ABS blend (72%:28%, by weight) at an 8% fiber loading. The fibers and the polymer blend were compounded in a Werner & Pfleiderer co-rotating intermeshing twin screw extruder. The resin was melted in the upstream melting section at a temperature of 500° F. (260° C.) prior to introduction of the fibers. The compounded material was injection molded to form a test piece using a melt temperature of 500° F. (260° C.) and a mold temperature of 160° F. (71° C.). Comparative test pieces were also prepared using Zoltek HT carbon fibers treated with X8 binder, an epoxy-urethane based binder sold by Zoltek Corporation and FORTAFIL CA fibers treated with P29 binder, an epoxy-based binder sold by Fortafil Fibers, Inc. The test pieces were evaluated to determine the Notched Izod Impact Strength and using the total energy in an Instrumented Impact Test. The results are summarized in Table 3.

TABLE 3A

| Fiber Type | Binder | Notched Izod (ft lb/in) | Instruments Impact Test: Total Energy (ft-lb) |
|---|---|---|---|
| FORTAFIL CA | P29 epoxy | 1.294 | 11.3 |
| ZOLTEK HT | X8 epoxy-urethane | 1.295 | 11.8 |
| ZOLTEK HT | ELVAMIDE polyamide terpolymer | 2.243 | 18.93 |
| GRAFIL | ELVAMIDE polyamide terpolymer | 2.059 | 20.18 |

The experiments were repeated using 10% carbon-fiber loading. The results are summarized in Table 3B.

TABLE 3B

| Fiber Type | Binder | (ft lb/in) Notched Izod | Instruments Impact Test: Total Energy (ft-lb) |
|---|---|---|---|
| FORTAFIL CA | P29 epoxy | 1.273 | 10.78 |
| ZOLTEK FIT | X8 epoxy-urethane | 1.10 | 10.82 |
| ZOLTEK HT | ELVAMIDE polyamide terpolymer | 1.936 | 15.15 |

EXAMPLE 4

Volume Resistivity and shielding effectiveness were determined for PC-ABS compounded with polyamide terpolymer binder-treated fibers in accordance With the invention. The results are summarized in Tables 4A and B. As can be seen, superior electrical properties are observed in the composition using the polyamide terpolymer binder.

TABLE 4A

| Fiber Type | Binder Type | Fiber Loading | Volume Resistivity (ohm-cm) |
|---|---|---|---|
| FORTAFIL CA | P29 epoxy | 8% | 1.0E4 |
| ZOLTEK HT | X8 epoxy-urethane | 8% | 1.6E3 |
| ZOLTEK HT | ELVAMIDE polyamide terpolymer | 8% | 2.9E2 |
| FORTAFIL CA | P29 epoxy | 10% | 1.4E2 |
| ZOLTEK HT | X8 epoxy-urethane | 10% | 7.0 |
| ZOLTEK HT | ELVAMIDE polyamide terpolymer | 10% | 2.4 |

TABLE 4B

| Fiber Type | Binder Type | Fiber Loading | Shielding Effectiveness (db) |
|---|---|---|---|
| FORTAFIL CA | P29 epoxy | 20% | 19.9 |
| ZOLTEK HT | X8 epoxy-urethane | 20% | 28.4 |
| ZOLTEK HT | ELVAMIDE polyamide terpolymer | 20% | 35.3 |

What is claimed is:

1. A composition comprising:
    (a) a thermoplastic resin comprising a blend of polycarbonate and acrylonitrile-butadiene-styrene copolymer; and
    (b) carbon fibers associated into bundles with a polyamide terpolymer binder, said bundles being dispersed within the thermoplastic resin wherein said composition has a surface resistivity below $10^5$ Ohm/Sq.

2. The composition of claim 1, wherein the carbon fibers are present in an amount of from 5 to 50% by weight of the composition.

3. The composition of claim 2, wherein the binder is present in an amount of from 0.5 to 10% by weight of the carbon fibers.

4. The composition of claim 1, wherein the binder is present in an amount of from 0.5 to 10% by weight of the carbon fibers.

5. The composition of claim 1, further comprising a flame retardant.

6. The composition of claim 1, wherein the blend comprises polycarbonate and acrylonitrile-butadiene-styrene copolymer in a ratio of from 10:90 to 90:10, by weight.

7. The composition of claim 6, wherein the carbon fibers are present in an amount of from 5 to 50% by weight of the composition.

8. The composition of claim 7, wherein the binder is present in an amount of from 0.5 to 10% by weight of the carbon fibers.

9. A method for making an injection-molded article comprising the steps of:
    (a) preparing a composition comprising a thermoplastic resin comprising a blend of polycarbonate and acrylonitrile-butadiene-styrene copolymer, and carbon fibers associated into bundles with a polyamide terpolymer binder, said bundles being dispersed within the thermoplastic resin;
    (b) heating the composition to melt the thermoplastic resin; and
    (c) injecting the heated composition into a mold shaped to form the article wherein said injection-molded article has a surface resistivity below $10^5$ Ohm/Sq.

10. The method of claim 9, wherein the carbon fibers are present in an amount of from 5 to 50% by weight of the composition.

11. The method of claim 10, wherein the binder is present in an amount of from 0.5 to 10% by weight of the carbon fibers.

12. The method of claim 9, wherein the blend comprises polycarbonate and acrylonitrile-butadiene-styrene copolymer in a ratio of from 10:90 to 90:10 by weight.

13. An injection-molded article prepared by a method comprising the steps of:
    (a) preparing a composition comprising a thermoplastic resin comprising a blend of polycarbonate and acrylonitrile-butadiene-styrene copolymer, and carbon fibers associated into bundles with a polyamide terpolymer binder, said bundles being dispersed within the thermoplastic resin;
    (b) heating the composition to melt the thermoplastic resin; and
    (c) injecting the heated composition into a mold shaped to form the article wherein said injection-molded article has a surface resistivity below $10^5$ Ohm/Sq.

14. The article of claim 13, wherein the carbon fibers are present in an amount of from 5 to 50% by weight of the composition.

15. The article of claim 14, wherein the binder is present in an amount of from 0.5 to 10% by weight of the carbon fibers.

16. The article of claim 13, wherein the blend comprises polycarbonate and acrylonitrile-butadiene-styrene copolymer in a ratio of from 10:90 to 90:10 by weight.

17. A method for increasing the impact strength of a PC-ABS blend having carbon fibers dispersed therein, comprising the step of coating the carbon fibers with a polyamide terpolymer binder prior to dispersing them in the PC-ABS blend, wherein the PC-ABS blend having carbon fibers has a surface resistivity below $10^5$ Ohm/Sq.

* * * * *